US010789657B2

United States Patent
Devarakonda et al.

(10) Patent No.: US 10,789,657 B2
(45) Date of Patent: Sep. 29, 2020

(54) SYSTEM AND METHOD FOR COMPRESSOR SCHEDULING

(71) Applicant: AI ALPINE US BIDCO INC., Wilmington, DE (US)

(72) Inventors: Maruthi Narasinga Rao Devarakonda, Waukesha, WI (US); Aaron Avagliano, Dallas, TX (US); Trevor James Kirsten, Munich (DE); James Richard Zurlo, Madison, WI (US); Douglas Alan Kiesling, Richfield, WI (US)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 581 days.

(21) Appl. No.: 15/707,227

(22) Filed: Sep. 18, 2017

(65) Prior Publication Data

US 2019/0087917 A1 Mar. 21, 2019

(51) Int. Cl.
*G06Q 50/06* (2012.01)
*F04D 27/00* (2006.01)
(Continued)

(52) U.S. Cl.
CPC ............ *G06Q 50/06* (2013.01); *F04D 27/00* (2013.01); *G06Q 10/04* (2013.01); *G06Q 50/02* (2013.01);
(Continued)

(58) Field of Classification Search
CPC ............ G06Q 50/02; G06Q 10/06314; G06Q 10/067; G06Q 30/018; G06Q 50/06;
(Continued)

(56) References Cited

U.S. PATENT DOCUMENTS 2,867,084 A * 1/1959 Criswell ................... F02C 9/38
60/39.281
3,423,930 A * 1/1969 Moore, Jr. ............... G05D 7/03
60/39.281
(Continued)

FOREIGN PATENT DOCUMENTS

CA 1 256 835 A1 7/1989
JP 5781192 B2 7/2015
(Continued)

OTHER PUBLICATIONS

"Compressor scheduling in oil fields," by Eduardo Camponogara, et al., published Oct. 23, 2009 by Optim Eng. (2011) vol. 12, pp. 153-174.*
(Continued)

*Primary Examiner* — Tyler W Knox
(74) *Attorney, Agent, or Firm* — Fletcher Yoder, P.C.

(57) ABSTRACT

A tangible, non-transitory computer readable medium includes computer instructions stored thereon, the computer instructions, when executed by a processor, cause the processor to retrieve model inputs indicative of mechanical systems data, economic data, contractual data, regulatory data, or any combination thereof, associated with at least one compression system. Furthermore, the instructions cause the processor to retrieve a model that derives an operation schedule for the at least one compression system based on the model inputs. Then the instructions cause the processor to derive an operation schedule for the at least one compression system based on the model inputs and the model, and apply the operation schedule to the at least one gas compression system.

20 Claims, 3 Drawing Sheets

(51) Int. Cl.
*G06Q 10/04* (2012.01)
*G06Q 50/02* (2012.01)
*G06N 3/04* (2006.01)
*G06Q 10/06* (2012.01)
*G06Q 30/00* (2012.01)

(52) U.S. Cl.
CPC ............. *G06N 3/04* (2013.01); *G06Q 10/067* (2013.01); *G06Q 10/06314* (2013.01); *G06Q 30/018* (2013.01)

(58) Field of Classification Search
CPC ......... G06Q 10/0631; G06Q 10/06312; G06Q 10/06339; G06Q 10/043; G06Q 10/047; G06Q 10/0639; G06N 3/08; F02C 6/14; F02C 6/08; F04D 27/00; F02K 3/00; F02K 5/00; F02W 2746/00039; F02W 2746/00223; F02W 2746/00256
See application file for complete search history.

(56) References Cited

U.S. PATENT DOCUMENTS

| | | | | |
|---|---|---|---|---|
| 3,529,419 | A * | 9/1970 | Reed | F02C 9/22 60/791 |
| 4,486,148 | A * | 12/1984 | Battah | F04B 35/002 417/2 |
| 4,640,665 | A * | 2/1987 | Staroselsky | F02C 6/00 415/1 |
| 5,058,537 | A * | 10/1991 | Paul | F01B 7/14 123/193.6 |
| 5,769,610 | A * | 6/1998 | Paul | F02B 63/06 417/228 |
| 6,269,299 | B1 * | 7/2001 | Blotenberg | G05B 19/056 290/40 R |
| 6,988,358 | B2 * | 1/2006 | Mehail | F02G 3/02 60/39.6 |
| 7,967,036 | B2 * | 6/2011 | Ding | F17C 5/007 141/44 |
| 8,776,528 | B2 | 7/2014 | Liedtke et al. | |
| 9,316,178 | B2 * | 4/2016 | Hagen | F02M 21/0215 |
| 9,909,442 | B2 * | 3/2018 | Desai | F01D 17/24 |
| 10,474,113 | B2 * | 11/2019 | Ewens | G05B 13/0265 |
| 2002/0053196 | A1 * | 5/2002 | Lerner | F17D 1/14 60/39.182 |
| 2006/0179824 | A1 * | 8/2006 | Roser | F01N 13/0097 60/289 |
| 2010/0095915 | A1 * | 4/2010 | Evans-Beauchamp | F02B 33/40 123/68 |
| 2010/0287945 | A1 * | 11/2010 | Liedtke | F02C 3/22 60/773 |
| 2012/0017602 | A1 * | 1/2012 | Hansen | F02C 9/00 60/778 |
| 2013/0231909 | A1 * | 9/2013 | Noureldin | G06F 30/20 703/6 |
| 2013/0238154 | A1 * | 9/2013 | Noureldin | G06F 30/20 700/288 |
| 2013/0333671 | A1 * | 12/2013 | Walser | F02D 41/0027 123/480 |
| 2014/0182561 | A1 * | 7/2014 | Ibizugbe, Jr. | F02M 21/0227 123/511 |
| 2015/0152791 | A1 * | 6/2015 | White | F02C 9/26 60/773 |
| 2015/0184550 | A1 * | 7/2015 | Wichmann | F01K 13/02 700/287 |
| 2015/0185716 | A1 * | 7/2015 | Wichmann | G05F 1/66 700/287 |
| 2015/0226133 | A1 * | 8/2015 | Minto | F02C 3/34 60/39.27 |
| 2015/0240719 | A1 * | 8/2015 | Kraft | F01D 15/10 290/52 |
| 2015/0377148 | A1 * | 12/2015 | Minto | F02C 3/34 60/772 |
| 2016/0146118 | A1 * | 5/2016 | Wichmann | F01D 21/003 701/100 |
| 2016/0147204 | A1 * | 5/2016 | Wichmann | G05B 13/042 700/287 |
| 2016/0186658 | A1 * | 6/2016 | Vorel | F02C 9/40 701/108 |
| 2016/0258361 | A1 * | 9/2016 | Tiwari | G06Q 10/06 |
| 2016/0258363 | A1 * | 9/2016 | Tiwari | G05B 13/026 |
| 2016/0261115 | A1 * | 9/2016 | Asati | G05B 19/102 |
| 2016/0281607 | A1 * | 9/2016 | Asati | F02C 6/18 |
| 2017/0364043 | A1 * | 12/2017 | Ganti | G05B 13/048 |

FOREIGN PATENT DOCUMENTS

| | | | | |
|---|---|---|---|---|
| JP | 5997626 | B2 * | 9/2016 | |
| KR | 20090035734 | A * | 4/2009 | ........ F25J 3/04533 |
| KR | 20090035734 | A | 4/2009 | |
| KR | 20100037627 | A * | 4/2010 | ........ F01K 23/067 |
| KR | 20100037627 | A | 4/2010 | |
| KR | 20120040710 | A * | 4/2012 | .............. F25J 3/067 |
| KR | 20120040710 | A | 4/2012 | |
| MX | 311265 | B | 7/2013 | |
| WO | 2012024758 | A1 | 3/2012 | |
| WO | 2014086414 | A1 | 6/2014 | |
| WO | WO-2014086414 | A1 * | 6/2014 | ........ F02M 21/0227 |

OTHER PUBLICATIONS

"A comparison of automation techniques for optimization of compressor scheduling," by H.H. Nguyen, et al., published Apr. 11, 2007, in Advances in Engineering Software vol. 39 (2008) pp. 178-188.*

"Optimal Scheduling of Production and Compression in Gas Fields," by J.E. Murray III, et al., in Jan. 1978 by Journal of Petroleum Technology, pp. 109-116.*

* cited by examiner

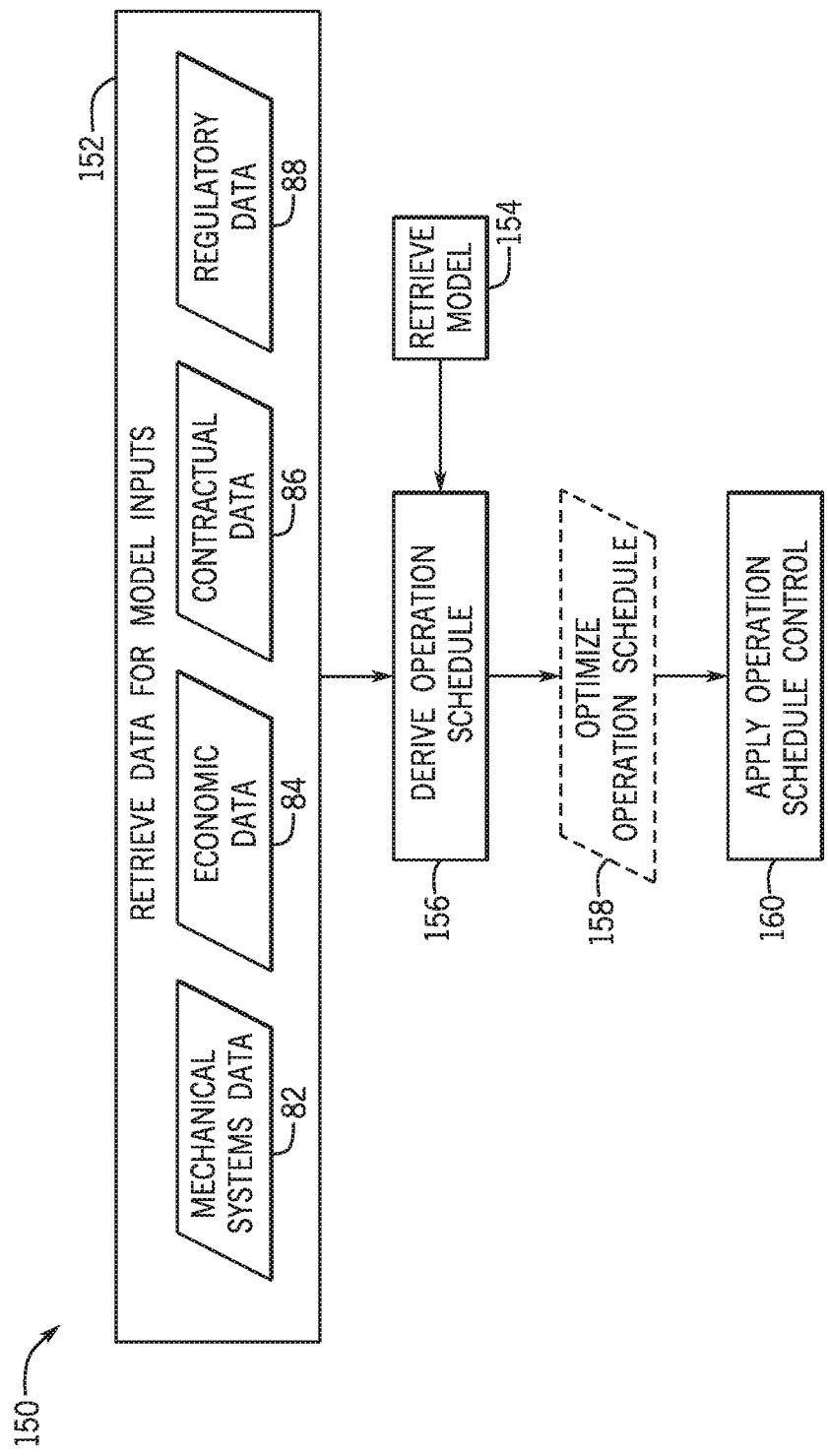

SYSTEM AND METHOD FOR COMPRESSOR SCHEDULING

BACKGROUND

The subject matter disclosed herein relates to compressors, and, more particularly, to systems and methods for compressor scheduling.

A compression system at a compressor station may typically be used to compress a fluid (e.g., natural gas) for transportation, storing, and/or directing the compressed fluid to various recipients. The compression system may compress natural gas to a target pressure to facilitate the flow of natural gas along a natural gas transportation system to various recipients, such as storage facilities, underground repositories (e.g., salt mines), and the like. Compression via the compression system may be controlled via an operations schedule. Thus, it may be desirable to improve the operation schedule of the compression system, such as compression systems used for natural gas compression.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a tangible, non-transitory computer readable medium includes computer instructions stored thereon, the computer instructions, when executed by a processor, cause the processor to retrieve model inputs indicative of mechanical systems data, economic data, contractual data, regulatory data, or any combination thereof, associated with at least one compression system. Furthermore, the instructions cause the processor to retrieve a model that derives an operation schedule for at least one compression system based on the model inputs. Then the instructions cause the processor to derive an operation schedule for at least one compression system based on the model inputs and the model, and apply the operation schedule to at least one gas compression system.

In another embodiment, a method includes retrieving model inputs indicative of mechanical systems data, economic data, contractual data, regulatory data, or any combination thereof, associated with at least one compression system. In addition, the method includes retrieving a model that derives an operation schedule for at least one compression system based on the model inputs, deriving an operation schedule for at least one compression system based on the model inputs and the model, and applying the operation schedule to at least one compression system.

In another embodiment, a controller includes a processor and memory storing instructions that cause the processor to retrieve model inputs indicative of mechanical systems data, economic data, contractual data, regulatory data, or any combination thereof, associated with at least one compression system. The instructions also cause the processor to retrieve a model configured to derive an operation schedule for at least one compression system based on the model inputs and derive an operation schedule for at least one compression system based on the model inputs and the model. The instructions then cause the processor to apply the operation schedule to at least one compression system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 is a flow chart of an embodiment of a process for deriving and applying the operation schedule for the compression system of FIG. 1.

DETAILED DESCRIPTION

Figure 1:
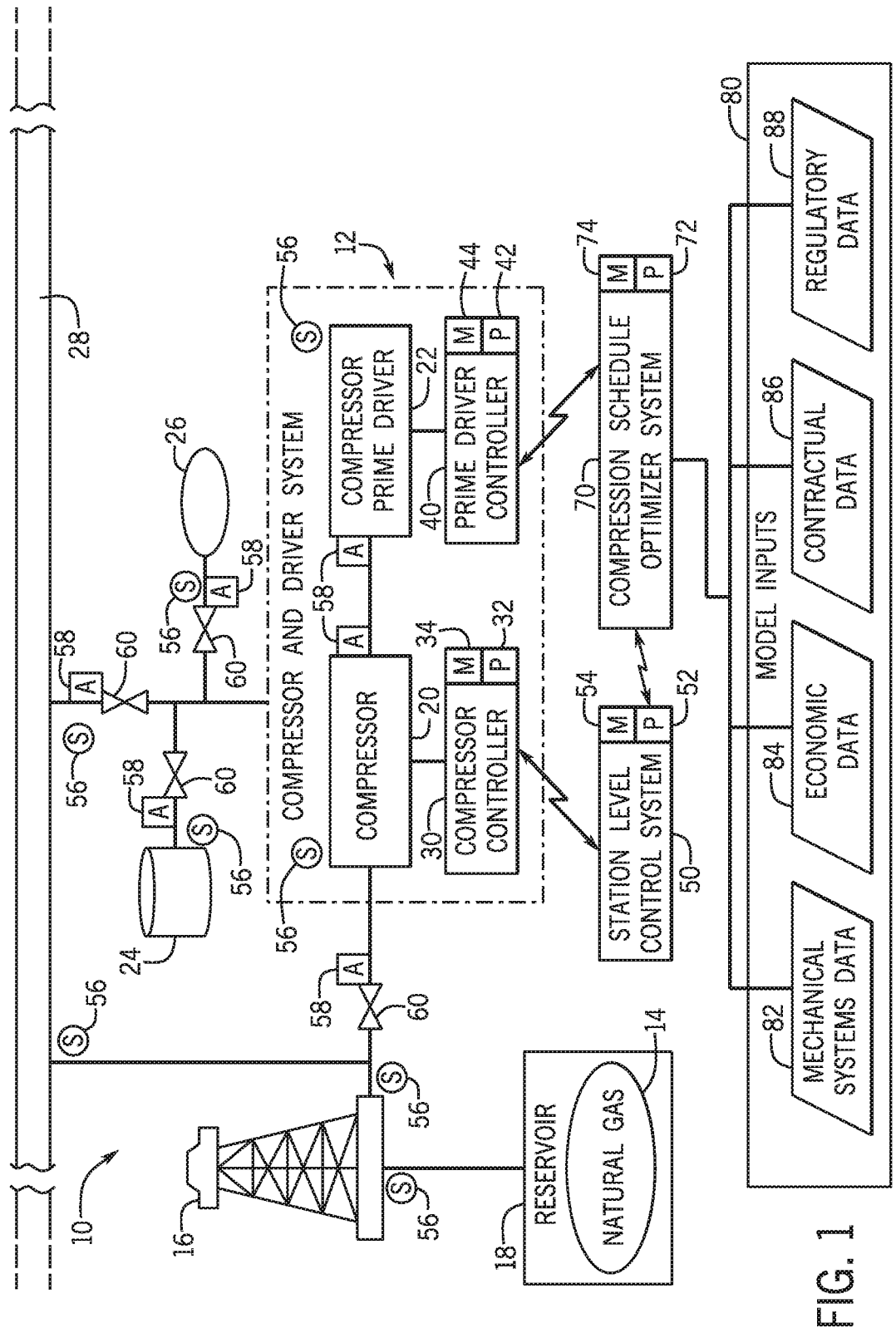
FIG. 1 is a block diagram of an embodiment of a compression system, applying techniques for deriving an operation schedule.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

A compression system may include a compressor system and a driver system (e.g., motor) powering the compression system. In use, the compression system may compress a fluid, such as natural gas, and be controlled via an operating schedule that determines compression pressures, time of compression, volume of fluid to compress, and so on. Compression systems that operate on a more "loaded" schedule, for example, having higher operating hours, pressures, volume flows, and the like, than the same compression system operating and a less loaded schedule having less hours, less pressures, and/or smaller volumes flows. Indeed, various conditions associated with operation of the compression system in a natural gas transportation system may affect the life of subsystems and components. For example, components of the driveline between the compressor and compressor prime drive may include a coupling with a rubber element of an axial plug-in disc. The rubber element may experience static and dynamic forces, thermal changes, as well as other stress factors, during prolonged operation. For example, the rubber element may experience degradation due a high operation time and/or a high number of start/stop events (e.g., engine starting and stopping) that cause the rubber element to crack.

If the components are not properly maintained, or a condition goes undetected, the degradation factors may cause undesired maintenance (e.g., costs) that may lead to a decrease in efficiency, lower availability, and loss of revenue. Furthermore, the price of natural gas may be low at the start of any time period (e.g., a day, week, month, or year), such that compressing natural gas to various recipients during the start of the time period may not optimize profits, for example, especially when the price of natural gas drops later in the time period. As a further example, a compression system operating in a large piping network may be under contractual obligation to transport a baseline volume of natural gas to a customer, such that the compression system meets the baseline volume demand for natural gas on a periodic basis (e.g., every day, week, month, or year). Thus, it may be desirable to monitor certain characteristics of the components to detect conditions for improved operational efficiency and availability, while complying with operation constraints and profit plans (e.g., contractual obligations, emission regulations, return on investment plans, and so on).

Accordingly, some embodiments of the present disclosure relate to deriving an operation schedule for one or more compressor driver systems, based on model inputs to a compression schedule optimizer system. Model inputs to the compression schedule optimizer may include mechanical systems data, data indicative of the pipeline network and pipeline storage (e.g., "pipeline data"), economic data, contractual data, and/or regulatory data. The model inputs may be used to execute a model that performs calculations and/or establishes relationships between the model inputs to determine an operation schedule for the compression system. For example, the compression schedule optimizer system may receive the model inputs, such as the operating pressure of the pipeline, the location of compressors along the natural gas transportation system, the composition of the natural gas, the price of natural gas at various points in time, the volume of natural gas pumped for that day, the production rates of natural gas, wells, biogas, synthetic gas (e.g., or renewably produced, such as via methanation, solar methods, or wind methods), among other suitable model inputs (e.g., mechanical systems data including data suitable for determining aging of equipment, economic data, contractual data, and regulatory data). Then, the compression schedule optimizer system may use the model inputs and input them into the model to derive the operation schedule for the natural gas transportation system. The operation schedule for the compressor may be applied to one or more compression system to control various outputs by one or more compressors and one or more compressor prime drivers (e.g., motors used to drive compressors, such as internal combustion engines, electric motors, turbine engines). For example, the operation schedule for the compressor may include determining which compression systems to operate, for how long to operate the compression system(s), and under what conditions (e.g., pressure, temperature, flow rate) to operate at. By deriving an improved compression schedule, the techniques described herein may provide for increased efficiency and economic return on compression assets used.

Turning to FIG. 1, depicted is a block diagram of an embodiment of a natural gas transportation system 10 that includes a compression system, applying techniques for deriving an operation schedule. In the illustrated embodiment, the natural gas transportation system 10 includes a compression system 12. The compression system 12 facilitates the transportation (e.g., the flow) of natural gas 14 (e.g., conventional gas, biogas, deep natural gas, shale gas, tight gas, methane hydrates, synthetic gas, etc.) from a producing oil or gas rig 16 or other gas generating systems (e.g., biogas plant, methanation plant, etc.) to end users. Although the illustrated embodiment includes a derrick as the rig 16, in some embodiments, the rig 16 may be a mobile drilling rig, an automated drilling rig, a subsea rig, or any other rig that may extract natural gas 14 from a reservoir 18. In some embodiments, the reservoir 18 may be located under the surface of the Earth's crust, such that vertical and/or horizontal drilling may facilitate the extraction of the natural gas 14 out of the reservoir 18 and/or other natural gas producing facilities.

Various compression systems 12 may be placed along the natural gas transportation system 10 (e.g., along a Global Transmission Network) to maintain a target flow and pressure of natural gas 14. For example, the natural gas transportation system 10 may be 5,000 miles long (or any distance in length) and include various compression systems 12 along the natural gas transportation system 10 to meet consumer demand. That is, the compression system 12 may be included along the length of the natural gas transportation system 10 at 40 mile intervals, 50 mile intervals, 75 mile intervals, 100 mile intervals or any suitable distance along the natural gas transportation system 10. In some embodiments, there may be more than one compression system 12 at a station along the natural gas transportation system 10. In some embodiments, the compression system(s) 12 may be exposed to the ambient air, but in alternative embodiments, the compression system(s) 12 may be housed in a facility.

In the illustrated embodiment, the compression system 12 includes a compressor 20. In some embodiments, the compressor 20 may be a flash gas compressor, a gas lift compressor, a reinjection compressor, a booster compressor, a vapor-recovery compressor, a casinghead compressor, reciprocating compressor, gear compressor, centrifugal compressor, axial compressor, and/or any other suitable positive displacement, dynamic, or kinetic compressor. For example, the compression system 12 may include a single-stage centrifugal compressor that transfers energy from a set of rotating impeller blades to the gas.

In the illustrated embodiment, the compression system 12 also includes a compressor prime driver 22 (e.g., motor or engine) that is coupled to the compressor 20. The compressor prime driver 22 may apply a rotative force to the components of the compressor 20, thereby driving the compressor 20. For example, a compressor prime driver 22 coupled to a single-stage centrifugal compressor may drive the set of rotating impeller blades of the single-stage centrifugal compressor. In some embodiments, the single-stage centrifugal compressor may be powered by natural gas 14 received from the oil rig 16 being burned in a compressor prime driver 22 (e.g., gas engine).

In some embodiments, the compressor prime driver 22 may be an internal combustion engine (ICE) (e.g., reciprocating gas engine), a gas turbine engine, and/or an electric motor. For example, when the compressor prime driver 22 is an ICE, the ICE may include a four-stroke piston engine configured to drive the compressor 20 to maintain the natural gas 14 expelled by the compressor 20 at a target pressure. Exemplary engines may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL).

After the rig 16 extracts natural gas 14 from reservoir 18 via certain conduits of the rig 16, the natural gas 14 may travel along the natural gas transportation system 10, in response to a pressure differential within the natural gas transportation system 10 caused by the compressor 20. The compressor prime driver 22 drives components of the compressor 20 (e.g., the blades of the rotor), thereby causing the compressor 20 to transport natural gas 14 at target parameters, such as at a target mass flow rate, pressure, volume, or the like.

As a result, in an embodiment, the compression system 12 may transport natural gas 14 to a storage facility 24. In some embodiments, the natural gas 14 may be stored in storage facilities 24, such as above-ground gas holders. For example, the compressor 20 may transport natural gas 14 to an above ground gas holder (e.g., or any other suitable storage facility 24), such that the natural gas 14 may remain stored at a district pressure to provide extra natural gas 14 to meet demand during peak times. In other embodiments, the storage facility 24 may include a pipeline, such that gas may be temporarily stored in the pipelines that are used to transport natural gas 14. In other embodiments the storage facility 24 may include a liquid natural gas (LNG) facility that may store natural gas 14 that has been converted to liquid to facilitate the storage of the natural gas 14.

In addition or alternatively, the compression system 12 may transport natural gas 14 to an underground storage facility 26. In an embodiment, the underground storage facility 26 may include a mine, a depleted reservoir (e.g., gas reservoir, and the like). For example, the depleted natural gas reservoir may be an underground formation having a high porosity and permeability to facilitate holding the natural gas 14. In another embodiment, the underground storage facility 26 may include an aquifer reservoir, such that the underground, porous and permeable rock formations may serve as a natural water reservoir that may hold natural gas 14. In another embodiment, the underground storage facility 26 may include a salt formation (e.g., salt mine). For example, the salt formation substantially block natural gas 14 from escaping the walls of the salt formation (e.g., salt mine), thereby facilitating the underwater storage of the natural gas 14. Although the underground storage facility 26 is discussed as including the depleted gas reservoir, the aquifer reservoir, and/or the salt formation, in some embodiments, the underground storage facility 26 may include any other suitable underground storage system.

Furthermore, the compression system 12 may transport natural gas 14 to a Global Transmission Network (GTN) 28. In an embodiment, the GTN 28 includes a system that facilitates the transmission and distribution of natural gas 14 across pipelines connected domestically or across national border lines. For example, the compressor driver system 12 may expel natural gas to a neighboring country to meet the contractual demands for natural gas exports to that neighboring country.

In the illustrated embodiment, the compressor 20 may be coupled (e.g., via a wired or wireless connection) to a compressor controller 30. The compressor controller 30 may receive an automated and/or user input (e.g., via a user interface) to control the compressor 20. In more detail, the compressor controller 30 may include a processor(s) 32 (e.g., a microprocessor(s)) that may execute software programs to perform the disclosed techniques. Moreover, the processor 32 may include multiple microprocessors, one or more "general-purpose" microprocessors, one or more special-purpose microprocessors, and/or one or more application specific integrated circuits (ASICS), or some combination thereof. For example, the processor 32 may include one or more reduced instruction set (RISC) processors. The compressor controller 30 may include a memory device 34 that may store information such as control software, models, threshold values, configuration data, and the like. The memory device 34 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof).

Furthermore, in the illustrated embodiment, the compressor prime driver 22 coupled (e.g., via a wired or wireless connection) to a prime driver controller 40. The prime driver controller 40 may receive an automated and/or user input (e.g., via a user interface) to control the compressor prime driver 22. In more detail, the prime driver controller 40 may include a processor(s) 42 (e.g., a microprocessor(s)) that may execute software programs to perform the disclosed techniques. Moreover, the processor 42 may include multiple microprocessors, one or more "general-purpose" microprocessors, one or more special-purpose microprocessors, and/or one or more application specific integrated circuits (ASICS), or some combination thereof. For example, the processor 42 may include one or more reduced instruction set (RISC) processors. The prime driver controller 40 may include a memory device 44 that may store information such as control software, models, threshold values, configuration data, and the like. The memory device 44 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof).

In the illustrated embodiment, a station level control system 50 is communicatively coupled (e.g., via a wired or wireless connection) to one or more compressor driver system 12, the compressor controller 30, and/or the prime driver controller 40. In some embodiments, the station level control system 50 may be located away from the compression system 12. For example, the station level control system 50 may receive user inputs from a station operator (e.g., a person) to independently or collectively control the compressor 20, the compressor controller 30, the compressor prime driver 22, and/or the prime driver controller 40. In some embodiments, the station level controller 50 may receive data from the compressor 20, the compressor controller 30, the compressor prime driver 22, and/or the prime driver controller 40. In some embodiments, the instructions executed by the station level control system 50 may override the instructions executed by the compressor controller 30 and/or the prime driver controller 40. As mentioned above, there may be more than one compression system 12 at a station, such that each compression system may be communicatively coupled to a corresponding station level control system 50. As such, there may be more than one station level control system 50 at each station along the natural gas transportation system 10.

In the illustrated embodiment, the station level control system 50 includes a processor(s) 52 (e.g., a microprocessor(s)) that may execute software programs to perform the disclosed techniques. Moreover, the processor 52 may include multiple microprocessors, one or more "general-purpose" microprocessors, one or more special-purpose microprocessors, and/or one or more application specific integrated circuits (ASICS), or some combination thereof. For example, the processor 52 may include one or more reduced instruction set (RISC) processors. The station level control system 50 may include a memory device 54 that may store information such as control software, models, threshold values, configuration data, and the like. The memory device 54 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof).

Various internal and external components of the natural gas transportation system 10 may include one or more attached sensors 56 (e.g., flow sensors, pressure sensors, temperature sensors, knock sensors, vibration sensors, accelerometer, microelectrical-mechanical system (MEMS) microphone, speed sensor, position sensor, current sensor, clearance sensor (e.g., measuring distance between rotary and stationary components)) in wired or wireless communication with the controllers 30, 40, and/or 50. Furthermore, actuators 58 may include any suitable actuating devices, such as hydraulic actuators, pneumatic actuators, electric actuators, and the like. The actuators 58 may receive a signal from the controllers 30, 40, and/or 50 to drive movement of, for example, a valve 60 (e.g., to direct the flow of natural gas 14 in the natural gas transportation system 10.

The sensors 56, actuators 58, and the controllers 30, 40, and/or 50 may communicate using a standard network protocol, such as Bluetooth®, Dust Networks®, Z-Wave®, Wi-Fi, and ZigBee® via respective communication components (e.g., receivers and transmitters). Other wireless communication technologies that may be used are infrared and radio. As illustrated, the sensors 56 may be located at any suitable location on the natural gas transportation system 10. For example, the sensor 56 may be positioned anywhere along or about the oil rig 16, the compressor 20, the compressor prime driver 22, the storage facility 24, the underground storage facility 26, the GTN 28, and the like. Furthermore, the controllers 30, 40, and 50 may receive indications of the weather forecast, market information, and the like from sensors or other data sources to facilitate performing the subject matter disclosed below.

Furthermore, in the illustrated embodiment, a compression schedule optimizer system 70 includes a processor(s) 72 (e.g., a microprocessor(s)) that may execute software programs to perform the disclosed techniques. Moreover, the processor 72 may include multiple microprocessors, one or more "general-purpose" microprocessors, one or more special-purpose microprocessors, and/or one or more application specific integrated circuits (ASICS), or some combination thereof. For example, the processor 72 may include one or more reduced instruction set (RISC) processors. The compression schedule optimizer system 70 may include a memory device 74 that may store information such as control software, models, threshold values, configuration data, and the like. The memory device 74 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof).

Moreover, the compression schedule optimizer system 70 is configured to receive model inputs 80. More specifically, the compression schedule optimizer system 70 may receive model inputs 80, such as mechanical systems data 82, economic data 84, contractual data 86, regulatory data 88, pipeline data, and the like. As described in more detail below, in an embodiment, the compression schedule optimizer system 70 receives the model inputs 80 and a model (e.g., instructions and equations) that may associate the model inputs 80 to one another and perform calculations to derive the operation schedule. For example, the compression schedule optimizer system 70 may communicate control signals to the compressor 20, the compressor prime driver 22, and or any other suitable devices (e.g., actuators 58, valves, etc.) to execute the operation schedule, based on the model inputs 80. In some embodiments, the compression schedule optimizer system 70 may send the control signals to the compressor controller 30 and/or prime driver controller 40 to control the compressor 20 and/or compressor prime driver 22, respectively. In other embodiments, there may be a priority scheme such that the control signals from the compression schedule optimizer system 70 may override the control signals from the other controllers 30, 40.

It should be noted that any of the aforementioned controllers (e.g., the compressor controller 30, the prime driver controller 40, the station level control system 50, and the compression schedule optimizer system 70), hereinafter called "controllers 30, 40, 50, and 70," may be incorporated into one another or combined into any number of units. For example the controllers 30, 40, 50, 70 may be combined into one controller that is configured to controller the compressor 20, the compressor prime driver 22, actuators 58, and the like. That is, in an embodiment, all controllers may be included in the compression schedule optimizer system 70 to determine and apply an operation schedule for the compressor 20. The controllers 30, 40, 50, and 70 may be in wireless or wired communication (e.g. Ethernet) with a workstation (or other computing device such as a tablet, smartphone, laptop, cloud) and be capable of transmitting data over a long range to the workstation. The workstation may be located in the same site, plant, factory, etc. as the compression system 12. The controllers 30, 40, 50, and 70 may be capable of communicating with workstations external to its location and other locations and systems over a network (e.g., Internet). The various workstations, locations, and other locations and systems may all communicate with one another and data related to each system may be stored at an enterprise level via the network. For example, at the enterprise level, an entity may maintain engines running at any number of locations by monitoring the data received from the controllers 30, 40, 50, and 70, the workstations, and so forth. Furthermore, there may be more than one compression system 12 per station along the natural gas transportation system 10, such that there may be more than one controllers 30, 40, 50, 70. In addition, there may be more than one station along the natural gas transportation system 10.

Figure 2:
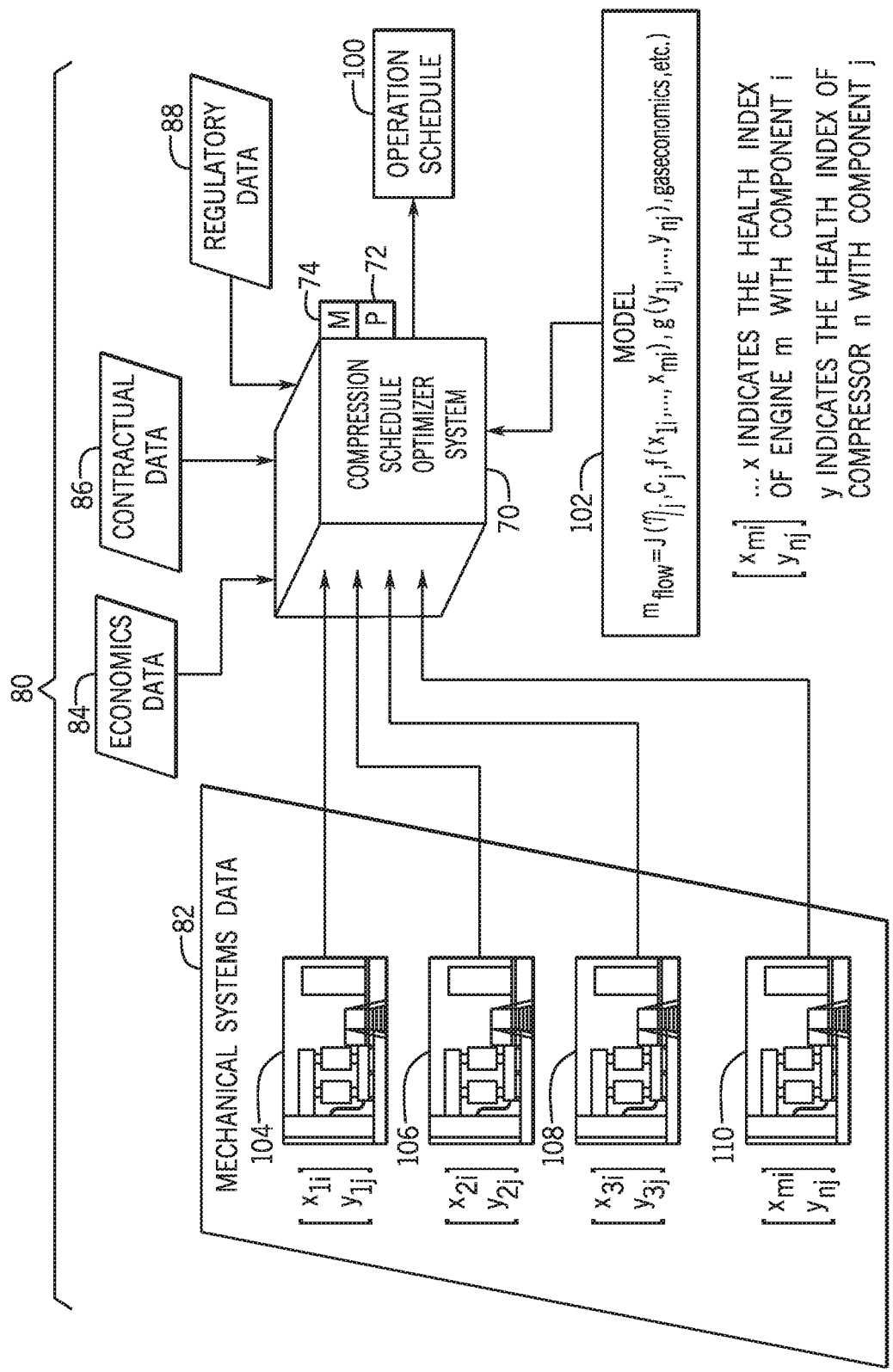
FIG. 2 is a block diagram of an embodiment of a compression schedule optimizer system that determines the operation schedule applied to the compression system of FIG. 1.

FIG. 2 is a block diagram of an embodiment of a compression schedule optimizer system 70 that determines the operation schedule 100 applied to the compression system 12 of FIG. 1. In the illustrated embodiment, the compression schedule optimizer system 70 may receive model inputs 80, such as the mechanical systems data 82, the economic data 84, the contractual data 86, and regulatory data 88. In some embodiments, the compression schedule optimizer system 70 may additionally receive balance of plant data, which may include data associated with a valve that limits the suction pressure, and that may be located upstream the natural gas transportation system 10. Furthermore, the compression schedule optimizer system 70 may additionally receive pipeline data that includes the operating pressure of the pipeline, the composition of the natural gas, the volume of natural gas pumped for that day, the production rates of natural gas, wells, biogas, synthetic gas (e.g., or renewably produced, such as via methanation, solar methods, or wind methods).

In some embodiments, the compression schedule optimizer system 70 may then retrieve a model 102 that performs calculations to determine the operation schedule for a compression system 12. In some embodiments, the model 102 may include instructions for determining the operation schedule 100 (e.g., via performing calculations). Furthermore, the model 102 may establish relationships between the model inputs 80 (e.g., via equations). After determining the operation schedule 100 based on the model inputs 80 and the model 102, the compression schedule optimizer system 70 applies the operation schedule 100 to the compression system 12. It is to be understood that while the model 102 is depicted as equation-based, other models may include deep learning models 102 such as neural networks, state vector machines (SVMs), data mining systems, expert systems, and so on, suitable for processing the inputs 80 and for outputting the operation schedule 100.

The mechanical systems data 82 includes any data associated with the compression system 12 that may be updated at or near real-time, as well as logged data (e.g., historical logs, maintenance logs, service logs, and so on). In an embodiment, the mechanical systems data 82 may include the pipeline data mentioned above. In an embodiment, the mechanical systems data 82 may include measurements determined by sensors 56 located along the natural gas transportation system 10. For example, the compressor prime driver 22 may include the sensor 56 to track and measure the time the compression system 12 has been in operation (e.g., number of operating hours), to measure the pressure of natural gas entering and/or exiting the compression system 12, and the like. As such, time of operation, natural gas pressure at the compressor 20 inlet, and compressor 20 outlet, may be examples of the mechanical systems data 82. The time of operation and the pressure of the natural gas entering and/or exiting the compressor, among other suitable mechanical systems data 82, may be updated at or near real-time, such that updated mechanical systems data 82 may be sent to the compression schedule optimizer system 70 at or near real-time. Other examples include speeds (e.g., compressor 20 and/or compressor prime driver 22 speeds), clearances, operating temperatures for the compressor 20 and/or compressor prime driver 22, ambient temperatures, ambient pressures, humidity levels, and so on.

In some embodiments, the mechanical systems data 82 used as input may be constant (e.g., not vary over time). For example, the mechanical systems data 82 may include manufacturer specification values corresponding to the various components of the compression system 12, such that the specification values do not vary over time. For example, the compressor 20 and the compressor prime driver 22 may each include a manufacturer's operation life expectancy (e.g., a time that the compressor 20 is expected to provide functional utility for, such as 5 years, 10 years, 20 years) that does not vary with time. Using certain mechanical systems data 82, such as the manufacturer's life expectancy for the compression system and its various components, for example, the compression schedule optimizer system 70 may derive a mechanical health and/or degradation based on the mechanical systems data 82 (e.g., operating hours for the compression system 12 and/or components (e.g., compressor 20, driver 22). For example, a life curve may be used, that plots remaining life over number of operating hours, to determine expected life for components 20, 22. Similarly, statistical models, AI models, and the like, may be used to derive life expectancy, degradation, or a combination thereof, based on inputs 82. For compressor 20, a compressor efficiency, such as an isentropic efficiency, may also be derived based on the inputs 82.

Although the above mentioned examples only disclose mechanical systems data 82 that may be updated at or near real-time or remains constant in time, the compression schedule optimizer system 70 may receive any other suitable mechanical systems data to facilitate determining the operation schedule 100. Accordingly, in some embodiments, the mechanical systems data 82 may include, specifications (e.g., a size of a compressor), overall mechanical health inputted after an inspection, sensor data for the various components of the compression system, pressure measurements, engine efficiency, and the like.

Furthermore, the illustrated embodiment of the compression system 12 includes a first compression system 104, a second compression system 106, a third compression system 108, and an nth compression driver system 110. Furthermore, each compression system 12 includes a compressor 20 and a compressor driver 22 with any suitable number of respective components (e.g., controllers 30, 40). To facilitate discussion, equation 1 is included and described below.

$$[x_{mi} y_{nj}]^T \quad (1)$$

such that x represents the mechanical health index of compressor prime driver m with component(s) i and y represents the mechanical health index of compressor n with component(s) j. As mentioned above, the indexes may be derived (e.g. via mechanical systems data 82), or input by the user.

For example, the mechanical systems data 82 may include or be used to derive the mechanical health index of the first compressor prime driver and the first compressor (e.g., the first compression system 104) with components i and j, respectively, represented as $[x_{1i} \ y_{1j}]^T$. Similarly, the mechanical system data 82 may include or be used to derive the mechanical health index of the second compressor prime driver and the second compressor (e.g., the second compression system 106) with components i and j, respectively, represented as $[x_{2i} \ y_{2j}]_T$. Accordingly, the mechanical system data 82 may include or be used to derive the mechanical health index of the mth compressor prime driver and the mechanical health index of the nth compressor (e.g., the nth compression system 110) with components i and j, respectively, represented as nth compressor with components i and j, respectively, represented as $[x_{mi} \ y_{nj}]^T$.

With the following in mind, in some embodiments, the compression schedule optimizer system 70 may use as input mechanical systems data 82 for each compression system in the natural gas transportation system 10, such that the mechanical systems data 82 retrieved by the compression schedule optimizer system 70 includes or derives respective mechanical health indexes, $[x_{mi} \ y_{nj}]^T$, as defined by equation 1 for each compressor prime driver and compressor in each compression system 12.

The economic data 84 may include the price of natural gas 14, which may vary according to any periodic cycle. For example, the price of natural gas may vary every day, every two days, every week, or any suitable cycle. Furthermore, the economic data 84 retrieved by the compression schedule optimizer system 70 may also include business incentives (e.g., monetary bonuses) for operating the compression system under a threshold suction pressure value. Furthermore, the economic data 84 may include data associated with the costs for replacing the components of the compression systems (e.g., as a result of continuous operation). The economic data 84 may also include "green" credits, energy futures (e.g., future contract prices for energy), market valuations for energy, and so on. It should be noted that the economic data 84 is not limited to the examples described above, and in addition or alternatively, may include any model inputs 80 associated with the revenue and the costs of operating one or more compression systems (e.g., currency conversion rates between countries).

In the illustrated embodiment, the contractual data 86 may be retrieved by the compression schedule optimizer system 70. In some embodiments, the contractual data 86 may include any agreements between consumers and suppliers of natural gas 14 via the compression systems 12. For example, in an embodiment, the contractual data 86 may include indications of that a minimum quantity of natural gas 14 should be delivered to a certain consumer on a periodic (e.g., daily, weekly, monthly, yearly) basis. Additionally or alternatively, the contractual data 86 may include a threshold quantity of natural gas that should be delivered to a client, maximum time for which the natural gas can be stored in a storage facility, storage costs, and the like. It should be noted that the contractual data 86 may include any contractual agreements between the customers and producers of natural gas 14 transported with the use of the techniques described herein via the compression systems.

The regulatory data 88 may include data indicative of any governmental constraints governing the production, transportation, and delivery of natural gas 14 via the compression systems 12. In some embodiments, the regulatory data 88 may include emission standards that set quantitative limits on the permissible amount of specific air pollutants that may be released from a specific source (e.g., compression system 12) over specific timeframes. For example, the emission standards may include an upper limit on tons of natural gas that may be produced per year by one compression system 12. As another example, the emission standards may include an upper limit on emissions, in parts per million, for producing natural gas 14 via the compression system 12. It should be noted that the regulatory data 88 is not limited to emission standards and may also include machine performance regulatory data, health related regulatory data, operator goals, weather forecast data (e.g., humidity levels, temperature, natural disaster impact, etc.), or any suitable regulatory data.

In the illustrated embodiment, the compression schedule optimizer system 70 may use the model(s) 102 to perform derivations with the model inputs 80. The derivations may use the model inputs 80 to derive the operation schedule 100. In some embodiments, deriving the operation schedule 100 includes calculating a mass flow rate and/or target pressure for the natural gas expelled out of the compressor 20. For example, deriving the operation schedule 100 may include using the model 102, defining the calculations of equation 2, to perform calculations to determine an operation schedule 100 for each of the one or more compression systems. In an embodiment, equation 2 is defined as:

$$\dot{m}_{flow} = J(\eta_j, C_j, f[x_{1i}, \ldots, x_{mi}], g[y_{1i}, \ldots, y_{nj}], \text{gas economics, etc.}) \quad (2)$$

Such that $\dot{m}_{flow}$ represents the mass flow rate of natural gas 14, $\eta_j$ represents the efficiency (e.g., isentropic efficiency) of the jth compressor prime driver, $C_j$ represents the jth species concentration (e.g., emissions) emitting from a corresponding compressor prime driver 22 (e.g., internal combustion motor), $f[x_{1i}, \ldots, x_{mi}]$ is a cumulative function that accounts for the mechanical health index of compressor prime driver m with component(s) i, $g[y_{1i}, \ldots, y_{nj}]$ is a cumulative function that accounts for the mechanical health of compressor n with component(s) j, the gas economics represent the gas economics discussed above, and etc. represents other suitable variables (e.g., contractual data 86, regulatory data 88, gas pipeline conditions, gas composition, gas pressure, and environmental data, such as the temperature, seasons, humidity).

FIG. 3 is a flow diagram 150 of an embodiment of a process for deriving and applying the operation schedule by the compression schedule optimizer system 70. The process illustrated in flow diagram 150 may be implemented as computer instructions or code executable via the processor 72 and stored in the memory device 74. In an embodiment, the compression schedule optimizer system 70 retrieves data (e.g., mechanical systems data 82, economic data 84, contractual data 86, and regulatory data 88) and the model, e.g., model 102, that may include certain equations(s) (e.g., equation 2) and instructions for performing calculations to derive the operation schedule. In some embodiments, the compression schedule optimizer system 70 may iteratively optimize the operation schedule. After deriving the operation schedule, the operation schedule is applied to control one or more compression systems in the natural gas transportation system 10.

The flow diagram 150 includes retrieving data (process block 152). As described in detail above, the data may include the model inputs 80, such as the mechanical systems data 82, economic data 84, contractual data 86, the regulatory data 88, and any other suitable data (e.g., gas pipeline conditions, gas composition, gas pressure, and environmental data, such as the temperature, seasons, humidity). In some embodiments, the data (e.g., model inputs 80) may be retrieved via sensors arranged along the natural gas transportation system 10, on or around the various compression systems 12 (e.g., the first compression system 104, the second compression system 106, the third compression system 108, and the nth compression driver system 110). In some embodiments, the data may be received at or near real-time, thereby continuously updating the data that is used by the compression schedule optimizer system 70 to deriving the operation schedule.

In addition or alternatively, some of the data may be stored in the memory device 74 and accessed by the compression schedule optimizer system 70 when or before the compression schedule optimizer system 70 determines a new operation schedule. As such, retrieving data may include updating the model inputs 80 used to determine the operation schedule.

Furthermore, the illustrated embodiment includes retrieving the model 102 (process block 154). In some embodiments, the model 102 may include instructions or equations (e.g., similar to equation 2) that associate the model inputs 80 to one another. For example, the model inputs 80 may be associated to one another via the model 102 (e.g., based on calculations similar to those of equation 2). In some embodiments, the model 102 may be a table that is propagated based on various model inputs. The table may include columns corresponding to each of the model inputs 80 and rows that correspond to the respective values that are propagated periodically (e.g., at or near real-time) and given a location stamp. For example, when economic data 84 is constant, but the mechanical systems data 82 varies over-time, the model 102 may update the table at or near real-time to reflect new values that may be time and location stamped. As such, retrieving model inputs 80 and the model 102 may include updating the model inputs 80 at or near real-time. In some embodiments, the model inputs 80 in the table may be used to perform calculations.

After the compression schedule optimizer system 70 retrieves the model inputs 80 and the model 120 (process block 154), the compression schedule optimizer system 70 derives the operation schedule for one or more compression systems (process block 156). In some embodiments, the compression schedule optimizer system 70 derives the operation schedule by applying the model inputs 80 (e.g., at or near real-time) to the above mentioned equation 2. Based on the values for the model inputs 80, the compression schedule optimizer system 70 may determine a more efficient and/or profitable operation schedule. For example, during a time when the price of natural gas is high (e.g., based on economic data 84), the compression schedule optimizer system 70 may increase the mass flow rate of compressors corresponding to compression systems because the compression schedule optimizer system 70 determined that the pumping of natural gas would be economically more optimized.

In some embodiments, deriving the operation schedule 100 for one or more compression systems 12 may include operating compressors 20 based on a priority scheme. For example, the compression schedule optimizer system 70 may determine a priority scheme based on the model inputs 80. That is, the emission standards may put an upper limit on tons of natural gas that may be produced per year, such that the compression schedule optimizer system 70 may turn off all compressor prime drivers 22 that include internal combustion engines and only operate the compressor prime drivers that include electric motors, thereby reducing the emissions produced, while complying with other model inputs 80 (e.g., contractual data 86).

In some embodiments, deriving the operation schedule (process block 156) may include determining the time to operate the compressor 20 and/or compressor prime driver 22 of the compression system 12, the time to shut down the compressor 20 and/or compressor prime driver 22 of the compression system 12, the mass flow rate associated with each compressor 20 in operation, the pressure at the inlet or outlet of the compressor 20 in operation, the power (e.g., rotary power) delivered by each compressor prime driver 22 in operation, and the like. It should be noted that the operation schedule 100 may include other parameters associated with the operation of the compression system 12.

After deriving the operation schedule 100, the compression schedule optimizer system 70 may further optimize the operation schedule 100 (process block 158). In some embodiments, the operation schedule 100 is determined to be improved (e.g., more optimized) when profits (e.g., revenue minus costs) have been maximized. In other embodiments, the operation schedule 100 is determined to be more optimized when the target amount of natural gas 14 is supplied to customers, while minimizing the degradation to the compression system 12. For example, the operation schedule 100 is determined to be further optimized when the health index(es) of equation 1 is left unchanged or minimally altered due to the degradation resulting from operating the compression system 12.

In other embodiments, the determination of whether the derived operation schedule may be further optimized may be based on a priority scheme. That is, the compression schedule optimizer system 70 may include a priority scheme that assigns priority weight to the model inputs 80 it seeks to further optimize. For example, the priority scheme may include ranking the contractual data 86 and regulatory data 88 above (e.g. assigning them a higher weight) the economic data 84 and mechanical systems data 82, such that the compression schedule optimizer system 70 may give different weights to certain of the model inputs 80 (e.g., contractual data 86, the regulatory data 88, the economic data 84, and the mechanical systems data 82), and determine the operation schedule to be derived when the contractual data 86 and regulatory data 84 are weighed. In other embodiments, the further optimization of the operation schedule 100 may be based on any suitable mathematical models and/or optimization methods (e.g., differential evolution models, memetic algorithm models, dynamic stochastic general equilibrium models, model predictive control optimization, and real-time optimization models).

In response to the derived operation schedule not being sufficiently optimized, the compression schedule optimizer system 70 may perform further calculations (process block 158) to derive a new operation schedule 100 iteratively until the compression schedule optimizer system 70 has determined that the operation schedule 100 has been sufficiently optimized. If the operation schedule 100 is deemed sufficiently optimized, the compression schedule optimizer system 70 may then apply (process block 160) the operation schedule 100 to the one or more compressor systems 12.

In some embodiments, the optimized operation schedule is applied (process block 160) to the one or more compression systems 12 to operate so as to execute the transportation and delivery of the natural gas to the recipients (e.g., customers, storage facilities 24, reservoirs 26, conduit system). In some embodiments, applying the operation schedule 100 may include actuating, via the compression schedule optimizer system 70, the actuators 58 associated with executing the above mentioned parameters of the operation schedule. For example, the compression schedule optimizer system 70 may send a power signal to the compressor prime driver controller 42, to valves, other pumps, and so on, to cause the compressor 20 to transport gas at a target pressure and/or mass flow rate (e.g., based on the derived operation schedule 100).

Technical effects of the disclosure include techniques for enhanced control of the operation schedule for one or more compression systems suitable for compressing natural gas. In particular, the techniques may include using a model stored in the memory device, that when executed by the processor of the compression schedule optimizer system, causes the processor to receive data (e.g., mechanical systems data, economic data, contractual data, regulatory data, environmental data, gas pipeline conditions) to derive a target operation schedule for one or more compression systems. For example, the compression schedule optimizer may receive as data, the price of natural gas for the day (e.g., economic data), the efficiency and age of the compressor (e.g., mechanical systems data), emission limits for producing natural gas (e.g., regulatory data), and a minimum quantity of natural gas that a supplier has a contractual obligation to produce (e.g., contractual data) to derive an operation schedule for the compression systems associated with transporting the natural gas to the consumer(s). The techniques may iteratively perform calculations to derive a more optimized operation schedule that reduces production costs, increases revenue, and improves the use of the compression systems.

This written description uses examples to disclose the present techniques, including the best mode, and also to enable any person skilled in the art to practice the techniques, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A tangible, non-transitory computer readable medium comprising computer instructions stored thereon, the computer instructions, when executed by a processor, are configured to cause the processor to:
retrieve model inputs indicative of mechanical systems data, economic data, contractual data, and regulatory data associated with at least one compression system configured to compress natural gas, wherein:
the mechanical systems data comprises at least one of: a size of a compressor included in the at least one compression system, a health of the compressor, an operational life expectancy of the compressor, a pressure of gas entering the at least one compression system, a size of a compressor driver included in the at least one compression system, a health of the compressor driver, an operational life expectancy of the compressor driver, manufacturer specification values corresponding to the at least one compression system, sensor data for the at least one compression system, logged data for the at least one compression system, or pipeline data, or any combination thereof;
the economic data comprises at least one of: a price of natural gas, a monetary value for operating the at least one compression system based on a threshold value, costs for replacing one or more components of the at least one compression system, currency conversion rates between countries, green credits, an energy futures value, or market valuations for energy, or any combination thereof;
the contractual data comprises at least one of: a threshold quantity of natural gas delivered to a client, a maximum time for which the natural gas can be stored in a storage facility, or storage costs, or any combination thereof; and
the regulatory data comprises at least one of: an upper quantitative limit in the natural gas produced per year, an upper quantitative limit in emissions generated when producing the natural gas, operator goals, weather forecast data, machine performance regulatory data, or health related regulatory data, or any combination thereof;
retrieve a model configured to derive an operation schedule for the at least one compression system based on the model inputs, wherein the model comprises:

$\dot{m}_{flow}=J(\eta_j,C_j,f[x_{1i}, \ldots ,x_{mi}],g[y_{1i}, \ldots ,y_{nj}],$ gas economics, etc.);

derive the operation schedule for the at least one compression system based on the model inputs and the model; and
apply the operation schedule to the at least one compression system, wherein the at least one compression system is configured to operate at a mass flow rate and/or a pressure based on the operation schedule.

2. The computer readable medium of claim 1, wherein the computer instructions configured to cause the processor to retrieve the model inputs comprise computer instructions configured to cause the processor to retrieve the model inputs at or near real-time.

3. The computer readable medium of claim 1, wherein the at least one compression system comprises the compressor and the compressor driver coupled to the compressor and configured to drive the compressor, wherein the compressor is configured to control a flow of gas into a storage facility, a gas reservoir, a gas transportation system, or any combination thereof.

4. The computer readable medium of claim 3, wherein the compressor is a reciprocating compressor or a centrifugal compressor and the compressor driver is an internal combustion engine (ICE), a gas turbine, or an electric motor.

5. The computer readable medium of claim 1, wherein the computer instructions configured to cause the processor to retrieve the model inputs comprise computer instructions configured to cause the processor to retrieve the economic data comprising the price of natural gas and the regulatory data comprising the upper quantitative limit in the natural gas produced per year or the upper quantitative limit in emissions generated when producing the natural gas.

6. The computer readable medium of claim 1, wherein the operation schedule comprises the pressure of the at least one compression system.

7. The computer readable medium of claim 1, wherein the computer instructions configured to cause the processor to derive the operation schedule comprise calculating, via relationships established between the model inputs, the mass flow rate for the at least one compression system.

8. The computer readable medium of claim 1, wherein the operation schedule comprises a time of operation of the at least one compression system.

9. A method comprising:
retrieving, via a processor, model inputs indicative of balance of plant data mechanical systems data, economic data, contractual data, and regulatory data associated with at least one compression system configured to compress natural gas, wherein:
the mechanical systems data comprises at least one of: a size of a compressor included in the at least one compression system, a health of the compressor, an operational life expectancy of the compressor, a pressure of gas entering the at least one compression system, a size of a compressor driver included in the at least one compression system, a health of the compressor driver, an operational life expectancy of the compressor driver, manufacturer specification values corresponding to the at least one compression system, sensor data for the at least one compression system, logged data for the at least one compression system, or pipeline data, or any combination thereof;
the economic data comprises at least one of: a price of natural gas, a monetary value for operating the at least one compression system based on a threshold value, costs for replacing one or more components of the at least one compression system, currency conversion rates between countries, green credits, an energy futures value, or market valuations for energy, or any combination thereof;
the contractual data comprises at least one of: a threshold quantity of natural gas delivered to a client, a maximum time for which the natural gas can be stored in a storage facility, or storage costs, or any combination thereof; and
the regulatory data comprises at least one of: an upper quantitative limit in the natural gas produced per year, an upper quantitative limit in emissions generated when producing the natural gas, operator goals, weather forecast data, machine performance regulatory data, or health related regulatory data, or any combination thereof;

retrieving, via the processor, a model configured to derive an operation schedule for the at least one compression system based on the model inputs, wherein the model comprises:

$\dot{m}_{flow}=J(\eta_j,C_j,f[x_{1i}, \ldots ,x_{mi}],g[y_{1i}, \ldots ,y_{nj}]$, gas economics, etc.);

deriving, via the processor, the operation schedule for the at least one compression system based on the model inputs and the model; and applying, via the processor, the operation schedule to the at least one compression system, wherein the at least one compression system is configured to operate at a mass flow rate and/or a pressure based on the operation schedule.

10. The method of claim 9, wherein deriving the operation schedule comprises performing calculations to turn on a first set of the at least one compression system and maintain off a second set of the at least one compression system.

11. The method of claim 10, wherein deriving the operation schedule comprises determining the mass flow rate for natural gas flowing through each compressor in the first set of the at least one compression system.

12. The method of claim 11, wherein determining the mass flow rate comprises performing the calculations that determine the mass flow rate based on the model inputs.

13. The method of claim 12, wherein retrieving, via the processor, the model inputs comprises retrieving, via the processor, the economic data comprising the price of natural gas and the regulatory data comprising the upper quantitative limit in the natural gas produced per year or the upper quantitative limit in emissions generated when producing the natural gas.

14. The method of claim 9, comprising iteratively deriving, via the processor, the operation schedule until the operation schedule improves revenue generated, gas flow throughput, or any combination thereof, to a respective target threshold value.

15. The method of claim 9, wherein applying the operation schedule comprises operating a first set of the at least one compression system at a first mass flow rate, operating a second set of the at least one compression system at a second mass flow rate, and operating a third set of the at least one compression system at a third mass flow rate.

16. A controller comprising:
a processor; and
memory storing instructions configured to cause the processor to:
retrieve model inputs indicative of mechanical systems data, economic data, contractual data, and regulatory data associated with at least one compression system configured to compress natural gas, wherein:
the mechanical systems data comprises at least one of: a size of a compressor included in the at least one compression system, a health of the compressor, an operational life expectancy of the compressor, a pressure of gas entering the at least one compression system, a size of a compressor driver included in the at least one compression system, a health of the compressor driver, an operational life expectancy of the compressor driver, manufacturer specification values corresponding to the at least one compression system, sensor data for the at least one compression system, logged data for the at least one compression system, or pipeline data, or any combination thereof;

the economic data comprises at least one of: a price of natural gas, a monetary value for operating the at least one compression system based on a threshold value, costs for replacing one or more components of the at least one compression system, currency conversion rates between countries, green credits, an energy futures value, or market valuations for energy, or any combination thereof;

the contractual data comprises at least one of: a threshold quantity of natural gas delivered to a client, a maximum time for which the natural gas can be stored in a storage facility, or storage costs, or any combination thereof; and the regulatory data comprises at least one of: an upper quantitative limit in the natural gas produced per year, an upper quantitative limit in emissions generated when producing the natural gas, operator goals, weather forecast data, machine performance regulatory data, or health related regulatory data, or any combination thereof;

retrieve a model configured to derive an operation schedule for the at least one compression system based on the model inputs, wherein the model comprises:

$\dot{m}_{flow}=J(\eta_j,C_j,f[x_{1i}, \ldots ,x_{mi}],g[y_{1i}, \ldots ,y_{nj}]$, gas economics, etc.);

derive the operation schedule for the at least one compression system based on the model inputs and the model; and apply the operation schedule to the at least one compression system, wherein the at least one compression system is configured to operate at a mass flow rate and/or a pressure based on the operation schedule.

17. The controller of claim 16, wherein the memory storing instructions configured to cause the processor to retrieve the model inputs comprises instructions to retrieve the economic data comprising the price of natural gas and the regulatory data comprising the upper quantitative limit in the natural gas produced per year or the upper quantitative limit in emissions generated when producing the natural gas.

18. The controller of claim 16, wherein the operation schedule comprises a time of operation for the at least one compression system.

19. The controller of claim 16, wherein the compression system comprises the compressor and the compressor driver coupled to the compressor and configured to drive the compressor, wherein the compressor is configured to control a flow of a gas into a storage facility, a gas reservoir, a gas transportation system, or any combination thereof.

20. The controller of claim 16, wherein the model comprises a physics-based model, a deep learning model, a neural networks model, a state vector machines (SVMs) model, a data mining systems model, or any combination thereof.

* * * * *